H. ROSENBERG.
DAMPER.
APPLICATION FILED FEB. 24, 1919.
1,411,745.
Patented Apr. 4, 1922.
Fig. 1.
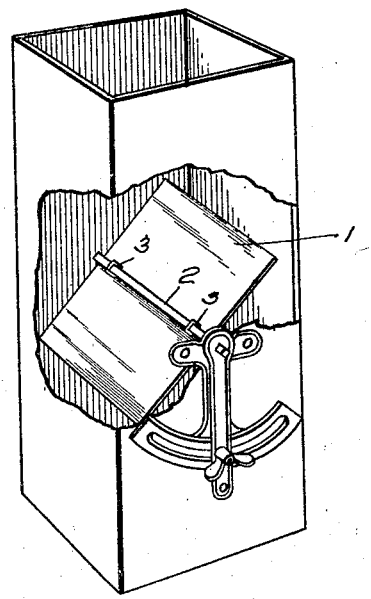
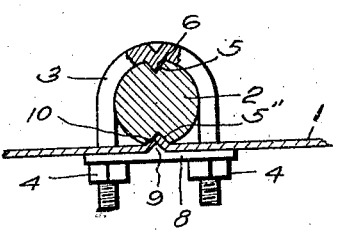
Fig. 3.
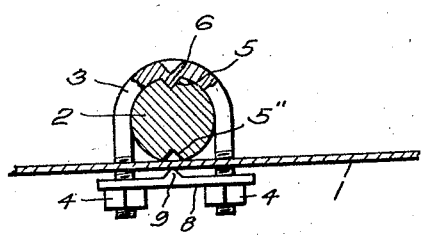
Fig. 2.
Inventor
Heyman Rosenberg,
By Edgar M Kitchin
His Attorney.
Witness
J. N. Lyles
C. H. Fesler

UNITED STATES PATENT OFFICE.

HEYMAN ROSENBERG, OF NEW YORK, N. Y.

DAMPER.

1,411,745.  Specification of Letters Patent.  Patented Apr. 4, 1922.

Application filed February 24, 1919. Serial No. 278,668.

*To all whom it may concern:*

Be it known that I, HEYMAN ROSENBERG, a citizen of the United States, residing at New York, in the county of New York and State of New York, have invented certain new and useful Improvements in Dampers; and I do hereby declare the following to be a full, clear, and exact description of the invention, such as will enable others skilled in the art to which it appertains to make and use the same.

This invention relates to improvements in dampers and like devices where the damper is connected to an operating rod.

The primary object in view is the increase in strength and stability and efficiency, and the decrease in the cost of production of such devices.

A more detailed object in view is the provision of means for preventing relative shifting of the rod and plate with respect to each other.

With these and further objects in view, as will in part hereinafter be stated and in part become apparent, the invention comprises certain novel constructions, combinations and arrangements of parts as will be subsequently specified and claimed.

In the accompanying drawing,—

Figure 1 is a perspective view of a fragment of a duct to which is applied an apparatus embodying the features of the present invention, parts of the duct being broken away for disclosing interior structure.

Figure 2 is an enlarged, detail, fragmentary section taken transversely through the rod and plate of Figure 1, parts being seen in elevation and the parts being shown in a partially assembled position.

Figure 3 is a similar view of the same with the parts fully assembled.

Referring to the drawing by numerals, 1 indicates a damper or like structure carried by the rod or shaft 2. The damper and rod are secured by U-bolts 3, clamping the parts together by the action of nuts 4, threaded on the ends of the bolt.

It has been customary heretofore to secure a damper rod to the damper by bolts passed through holes in the rod and damper but this arrangement has presented certain difficulties by reason of the fact that the bolts must be made of narrow diameter to prevent excess weakening of the rod and the rods are weakened in any event by the presence of the bolt receiving holes, so that either the bolts burn off or the rods weaken at the place of the bolts from the action of the heat and give way.

These difficulties are overcome by the employment of the present improved U-bolt, and while the U-bolt, if left perfectly smooth, and is stable in its connection, sometimes difficulty arises from the fact that the damper may have movement independent of the rod or vice versa, and this relative movement may be in either direction, angularly or longitudinally, of the rod when the rod is cylindrical in form or only longitudinally when the rod is angular in cross section. Such relative movement I propose to obviate by additional features as hereinafter pointed out.

Each of the U-bolts 3 is formed with a projection 6 adapted for entering a recess 5 in the rod 2. In addition to the recess 5, the rod 2 is formed at a diametrically opposite point from recess 5 with a similar recess 5″. Both recesses 5 and 5″ are formed preferably by punching, but may be otherwise produced if desired. The legs of the U-bolt 3 extend through the damper 1 and are sufficiently elongated to receive a cross plate 8, said plate being formed with an eye or opening at each end to pass over the projecting ends of the U-bolt. Midway between said ends and in line with the recess 5″, the plate 8 is formed with a projection 9. The parts are assembled as indicated in Figure 2. Then the nuts 4 are screwed up, thus forcing the plate 8 up to the position indicated in Figure 3, whereby the projection 9 is caused to force the engaged portion of damper 1 up into the recess 5″, producing a projection 10 formed of the material of damper 1 fitting over the projection 9 and within recess 5″. With this construction there is no possible chance for the rod 2 to slide longitudinally or to rotate, or for damper 1 to have similar relative action.

What I claim is:—

1. In a damper structure, the combination of a damper, a rod, and a U-bolt clamping the rod and damper together, the rod being formed with a recess remote from the damper and a recess adjacent to the damper, the bolt being formed with a projection extending into one of the recesses, and the damper being formed with a projection extending into the other recess.

2. In a damper structure, the combination of a damper, a rod, a U-bolt clamping the rod to the damper, and a plate engaging the U-bolt and clamped thereby to the damper, the rod being formed with a recess and the plate being formed with a projection in line with the recess and located and operating to retain a portion of the damper extending into the recess.

3. In a damper structure, the combination of a damper, a rod, a U-bolt surrounding the rod and extending through the damper and having nuts threaded on its extended ends, a cross plate connecting the threaded ends of the U-bolt and interposed between the nuts and the damper, the rod being formed with two recesses, the bolt being formed with a projection extending into one of the recesses, and the cross plate being formed with a projection located and proportioned for displacing a portion of the damper into the other recess.

4. In a damper structure, the combination of a damper, a rod, a U-bolt surrounding the rod and extending through the damper and having nuts threaded on its extended ends, a cross plate connecting the threaded ends of the U-bolt and interposed between the nuts and the damper, the rod being formed with a recess, and the cross plate having a projection located and proportioned for displacing a portion of the damper into the recess.

In testimony whereof I affix my signature in presence of two witnesses.

HEYMAN ROSENBERG.

Witnesses:
HENRY E. SAMUEL,
A. H. ABLES.